United States Patent
Wang et al.

(10) Patent No.: US 7,143,022 B1
(45) Date of Patent: Nov. 28, 2006

(54) SYSTEM AND METHOD FOR INTEGRATING SUBCIRCUIT MODELS IN AN INTEGRATED POWER GRID ANALYSIS ENVIRONMENT

(75) Inventors: Yong Wang, Fort Collins, CO (US); Mark Frank, Longmont, CO (US); Jerimy Nelson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 577 days.

(21) Appl. No.: 10/748,964

(22) Filed: Dec. 30, 2003

(51) Int. Cl.
*G06F 17/50* (2006.01)

(52) U.S. Cl. .......................... 703/14; 716/10

(58) Field of Classification Search ................ 703/14, 703/2; 716/1, 10
See application file for complete search history.

(56) References Cited

U.S. PATENT DOCUMENTS

| | | | |
|---|---|---|---|
| 3,688,278 A * | 8/1972 | Sauvan et al. ................. | 716/1 |
| 5,657,239 A * | 8/1997 | Grodstein et al. ............. | 716/6 |
| 6,151,568 A | 11/2000 | Allen et al. | |
| 6,412,101 B1 * | 6/2002 | Chang et al. ................. | 716/10 |
| 6,440,770 B1 | 8/2002 | Banerjee et al. | |
| 6,534,723 B1 | 3/2003 | Asai et al. | |
| 6,555,921 B1 | 4/2003 | Kwon et al. | |
| 6,675,155 B1 * | 1/2004 | Sasagawa et al. ............ | 706/13 |
| 7,010,471 B1 * | 3/2006 | Rosenberg ..................... | 703/2 |
| 2002/0112212 A1 | 8/2002 | Cohn et al. | |
| 2003/0001284 A1 | 1/2003 | List et al. | |
| 2003/0088395 A1 | 5/2003 | French et al. | |

OTHER PUBLICATIONS

Joseph N. Kozhaya et al.; "A Multigrid-like Technique for Power Grid Analysis"; Proceedings of the 2001 IEEE/ACM International Conference on CAD, San Jose, CA, Nov. 4-8, 2001; pp. 1-13.
Srinivas Bodapati et al. ; "High-Level Current Macro-Model For Power-Grid Analysis"; Annual ACM IEEE Design Automation Conference; New Orleans, LA, Jun. 10-14, 2002; 6 pages.
Yu-Min Lee et al. ; "Power Grid Transient Simulation in Linear Time Based on Transmission-Line-Modeling Alternating-Direction-Implicit Method"; IEEE Transactions on Computer-Aided Design of Integrated Circuits and Systems, vol. 21, No. 11, Nov. 2002;.
Yong Wang et al. ; "Integrated Power Grid Modeling and Analysis"; 12th Topical Meeting on Electrical Performance of Electronic Packaging, Princeton, NJ, Oct. 27-29, 2003; pp. 1-4.

* cited by examiner

*Primary Examiner*—Albert W. Paladini

(57) ABSTRACT

A system and method for integrating a plurality of subcircuit grids in a simulation environment. Upon obtaining a subcircuit layer of a particular granularity for each logical component of an electrical entity (e.g., a semiconductor die in a package and board environment), the nodes of a first subcircuit layer are interconnected to the nodes of a second subcircuit layer using a constraint-based search process.

42 Claims, 5 Drawing Sheets

SYSTEM AND METHOD FOR INTEGRATING SUBCIRCUIT MODELS IN AN INTEGRATED POWER GRID ANALYSIS ENVIRONMENT

CROSS-REFERENCE TO RELATED APPLICATION(S)

This application discloses subject matter related to the subject matter disclosed in the following commonly owned co-pending U.S. patent applications: (i) "INTEGRATED POWER GRID ANALYSIS SYSTEM AND METHOD," filed Dec. 30, 2003; application Ser. No. 10/748,820, in the name(s) of: Yong Wang, Karl Bois, Jerimy Nelson and Mark Frank; (ii) "SUBCIRCUIT FOR MODELING AN ON-CHIP POWER GRID IN AN INTEGRATED POWER GRID ANALYSIS ENVIRONMENT," filed Dec. 30, 2003; application Ser. No. 10/749,078, in the name(s) of: Yong Wang, Karl Bois, Jerimy Nelson and Mark Frank; (iii) "SYSTEM AND METHOD FOR COMPILING A POWER MAP BASED ON DIE FLOOR PLAN IN AN INTEGRATED POWER GRID ANALYSIS ENVIRONMENT," filed Dec. 30, 2003; application Ser. No. 10/748,022, in the name(s) of: Yong Wang, Jerimy Nelson and Mark Frank; (iv) "SYSTEM AND METHOD FOR IDENTIFYING COMMON VIA DENSITIES IN A PACKAGE," filed Dec. 30, 2003; application Ser. No. 10/748,019, in the name(s) of: Jerimy Nelson, Mark Frank and Yong Wang; (v) "SYSTEM AND METHOD FOR CREATING AND USING CONTROL LAYERS FOR DIFFERENT SUBCIRCUITS IN AN INTEGRATED POWER GRID ANALYSIS ENVIRONMENT," filed Dec. 30, 2003; application Ser. No. 10/749,039, in the name(s) of: Yong Wang, Mark Frank and Jerimy Nelson; (vi) "SUBCIRCUIT FOR MODELING ON-CHIP LOADS IN AN INTEGRATED POWER GRID ANALYSIS ENVIRONMENT," filed Dec. 30, 2003; application Ser. No. 10/748,483, in the name(s) of: Yong Wang, Karl Bois, Jerimy Nelson and Mark Frank; and (vii) "SYSTEM AND METHOD FOR CREATING A TRANSISTOR-BASED MODEL USING POWER INFORMATION IN AN INTEGRATED POWER GRID ANALYSIS ENVIRONMENT," filed Dec. 30, 2003; application Ser. No. 10/749,026, in the name(s) of: Yong Wang, Jerimy Nelson and Mark Frank, all of which are incorporated by reference herein.

BACKGROUND

Integrated circuit (IC) process scaling is leading high-performance chip designs to higher operating frequencies, lower power supply voltages, and higher power dissipation. This poses greater challenges to design engineers not only with respect to IC design, but also for package and power supply design. The close coupling between the levels of the power system and the need to trade off power vs. performance is making dynamic power management a necessity for chip design.

Increased chip functionality results in the need for huge power distribution networks, also referred to as power grids since they typically have a grid-like structure. Lower supply voltage, on the other hand, makes the voltage variation across the power grids highly critical since it may lead to chip failures. Voltage drops on the power grid reduce the supply voltage at logic gates and transistor cells to less than ideal operating references, which leads to reduced noise margin, higher logic gate delay, and overall slower switching. Reduced noise margins may also lead to false switching at certain logic gates and latches. Higher logic gate delays, on the other hand, may slow down the circuit enough so that timing requirements cannot be met. Thus, the power grids are rapidly becoming a limiting factor in high-performance IC chips, especially, advanced microprocessor designs.

As is well known, power is transferred through many complicated circuit structures before it is delivered where it is needed. From the power supply through the printed circuit board (PCB, or board, for short), packaging, input/output (I/O) pins, die bumps (e.g., controlled collapse chip connection or C4 bumps), and on-chip power grid to the transistors, every portion of the circuitry in the power delivery path plays a crucial role in ensuring the quality of power delivered. The robustness of the power delivery network, especially the on-chip power grid, is accordingly one of the keys to successful CPU design.

There are several sources that cause the degradation of the quality of power delivery systems such as IR drop, Ldi/dt drop, and resonance issues that gain prominence at high frequencies. The IR drop is typically very small due to the low resistance of the package and power grid network, while the inductance-induced voltage drop is a major concern in the package and power grid design. Whereas the IR can be simply verified by the DC analysis, the Ldi/dt drop issues need to be analyzed by transient simulation due the time-dependent differentiation nature of Ldi/dt drop.

To ensure the design quality of power delivery, extensive AC and transient simulations are required during the design process. Typically, both the power grid and on-chip load circuitry are simulated to obtain a reliable measure of the overall power distribution characteristics of a die. In addition, to achieve even higher levels of accuracy, the package and board environment associated with the semiconductor die is also simulated. In such applications, it becomes necessary to interconnect the various subcircuit layers, which may have different levels of granularity, before a simulation can be performed.

SUMMARY

In one embodiment, a method is provided for integrating a plurality of subcircuit grids in a simulation environment. Upon obtaining a subcircuit layer of a particular granularity for each logical component of an electrical entity (e.g., a semiconductor die in a package and board environment), the nodes of a first subcircuit layer are interconnected to the nodes of a second subcircuit layer using a constraint-based search process.

DETAILED DESCRIPTION OF THE DRAWINGS

Figure 1:
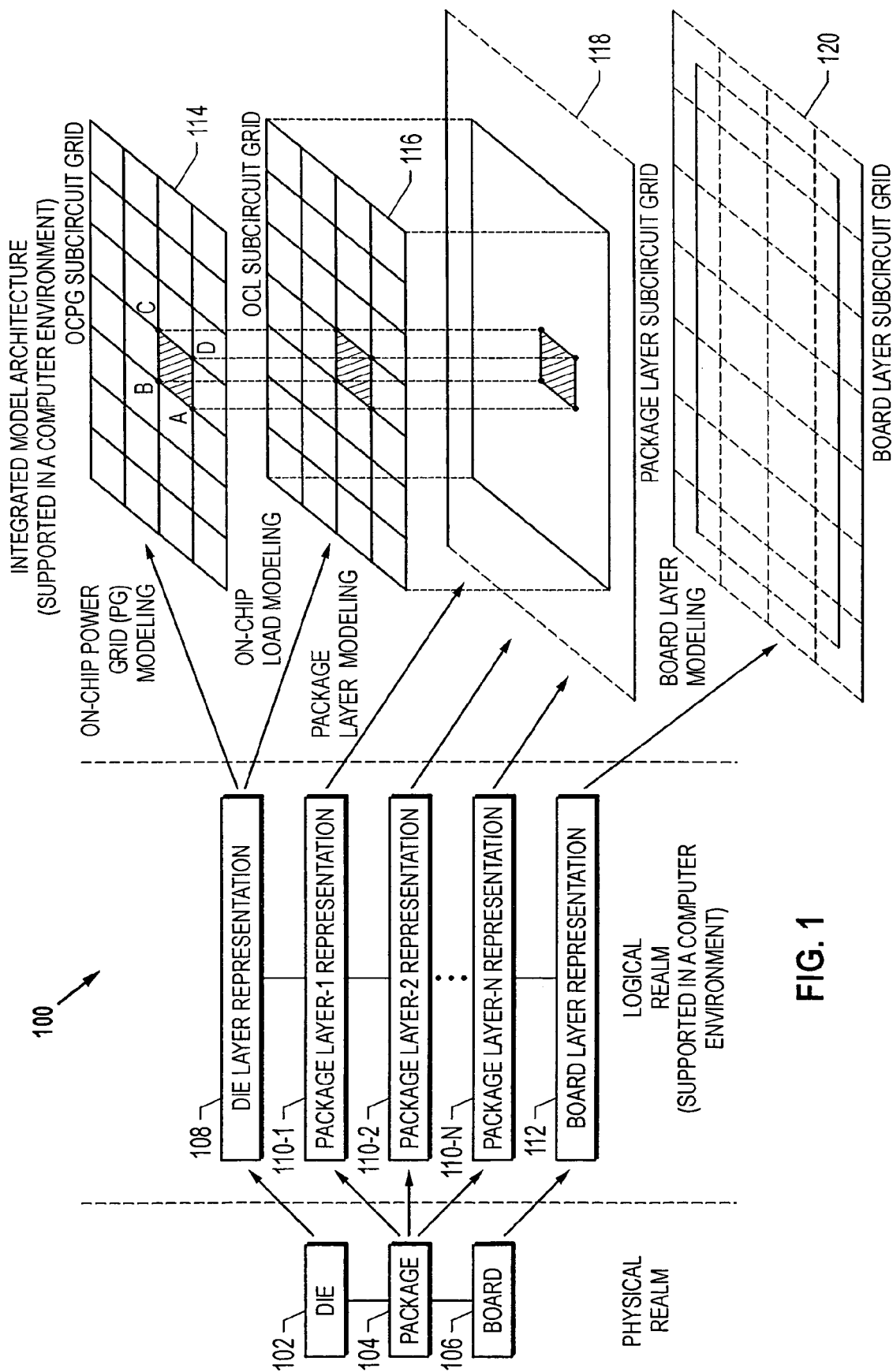
FIG. 1 depicts an integrated power grid analysis environment wherein different subcircuit models may be interconnected in accordance with an embodiment of the invention.

In the drawings, like or similar elements are designated with identical reference numerals throughout the several views thereof, and the various elements depicted are not necessarily drawn to scale. Referring now to FIG. 1, therein is depicted an embodiment of an integrated power grid (PG) analysis system 100 that may be supported in a computer environment, wherein different subcircuit models generated for an electrical entity may be interconnected in accordance with an embodiment of the invention into a single, integrated subcircuit construct. At the outset, it should be appreciated that although the subcircuit integration methodology will be set forth hereinbelow in particular detail with respect to an exemplary IC chip 102 within a package and board environment, the teachings of the present invention may also be practiced independent of an integrated PG analysis system. Accordingly, it will be apparent to those skilled in the art upon having reference hereto that the PG analysis system 100 essentially operates as one of the illustrative applications of the invention.

In one implementation, the PG analysis system 100 may be embodied within an IC design/simulation environment supported on one or more computer platforms that are coupled to appropriate IC design databases, e.g., high-level text description of an IC chip such as die 102, technology libraries, process and fabrication databases, architectural description in an applicable hardware description language (HDL), synthesis tools, layout or floor plan tools, timing and circuit simulation tools (e.g., SPICE), power extraction tools, and the like. It will be further recognized that the computer platform(s) supporting the PG analysis system 100 may be realized in any known or heretofore unknown computer hardware and software architectures, and can include various user interfaces suitable for computer-aided IC design and simulation.

In order to better capture the overall power distribution process with respect to a semiconductor die, the integrated PG analysis system 100 conceptualizes the power grid structure of the die in terms of its actual physical realm that includes packaging and board environment in which the die may be placed. Accordingly, the integrated PG analysis system 100 endeavors to effectuate a comprehensive modeling scheme with respect to the overall power distribution and consumption of the die 102 in relation to its package 104 as well as board substrate material 106. Each of the die 102, package 104 and board 106 aspects of the die's physical realm is therefore abstracted as one or more layout layers and associated control layers in a logical realm that is supported in such a suitable computer-aided design/simulation environment as mentioned above. Moreover, it should be appreciated that since the integrated PG analysis system 100 is capable of operating as a simulation-based predictive tool, the die 102 and at least some of its physical realm aspects (i.e., packaging and board layout) may exist only as conceptual designs. Accordingly, for purposes of the present patent application, the die-package-board assembly in the physical realm, or its existence in the associated design databases, may be deemed to be an example of an electrical entity under simulation.

As set forth in further detail in the commonly owned co-pending U.S. patent applications cross-referenced hereinabove, a die layer representation 108 is provided as part of the logical realm with regard to the die 102. Likewise, the package aspect of the die 102 may be captured as one or more package layer representations 110-1 through 110-N, depending on the package technology intended for implementation in the physical realm. Additionally, at least one board layer representation 112 having one or more layers may be included in the logical realm for adequately capturing the board-level aspects of power distribution. Consistent with the nomenclature provided in the foregoing discussion, consequently, the various die-level, package-level, and board-level layers may be treated as logical components of the die-package-board entity under simulation.

Each of the various layers set forth above may be modeled using the techniques described in one or more of the cross-referenced U.S. patent applications. For instance, the die layer representation 108 may be modeled to include an on-chip power grid (OCPG) model having a particular granularity that cooperates with a model of the on-chip circuitry (i.e., circuit load) of compatible granularity. By way of illustrative example, reference numeral 114 refers to the OCPG level of the die layer, wherein the entire power grid of the die 102 is segmented into a number of grid cells that are modeled as individual SPICE subcircuits. Likewise, the on-chip load (OCL) circuitry of the die layer is segmented into another subcircuit grid 116 such that the OCPG and OCL subcircuits may be interfaced together using suitable SPICE constructs. In addition, each of the package and board layer representations is also modeled using various compatible levels of granularity depending on application, efficiency and simulation accuracy. Reference numerals 118 and 120 respectively refer to the package and board layer subcircuit grids that may be combined within the integrated model architecture. Those skilled in the art will recognize that although not specifically shown in FIG. 1, there may be one or more via subcircuit grids disposed between the OCPG subcircuit grid layer 114 and OCL subcircuit grid layer 114 and OCL subcircuit grid layer 116 as well as between the package-level subcircuit grids 118 and board-level subcircuit grids 120. Further, additional models such as models for charge ration (QR) circuitry, voltage regulator module (VRM) circuitry, over-voltage clamping circuitry, power connector models, and the like, may also be provided as part of the model architecture associated with the integrated PG analysis system 100, which is described in greater detail in the aforementioned cross-referenced U.S. patent applications. Moreover, as will be described in detail below, the various SPICE-based subcircuit models may be interconnected into an integrated model construct for implementation in a suitable computer environment.

Figure 2:
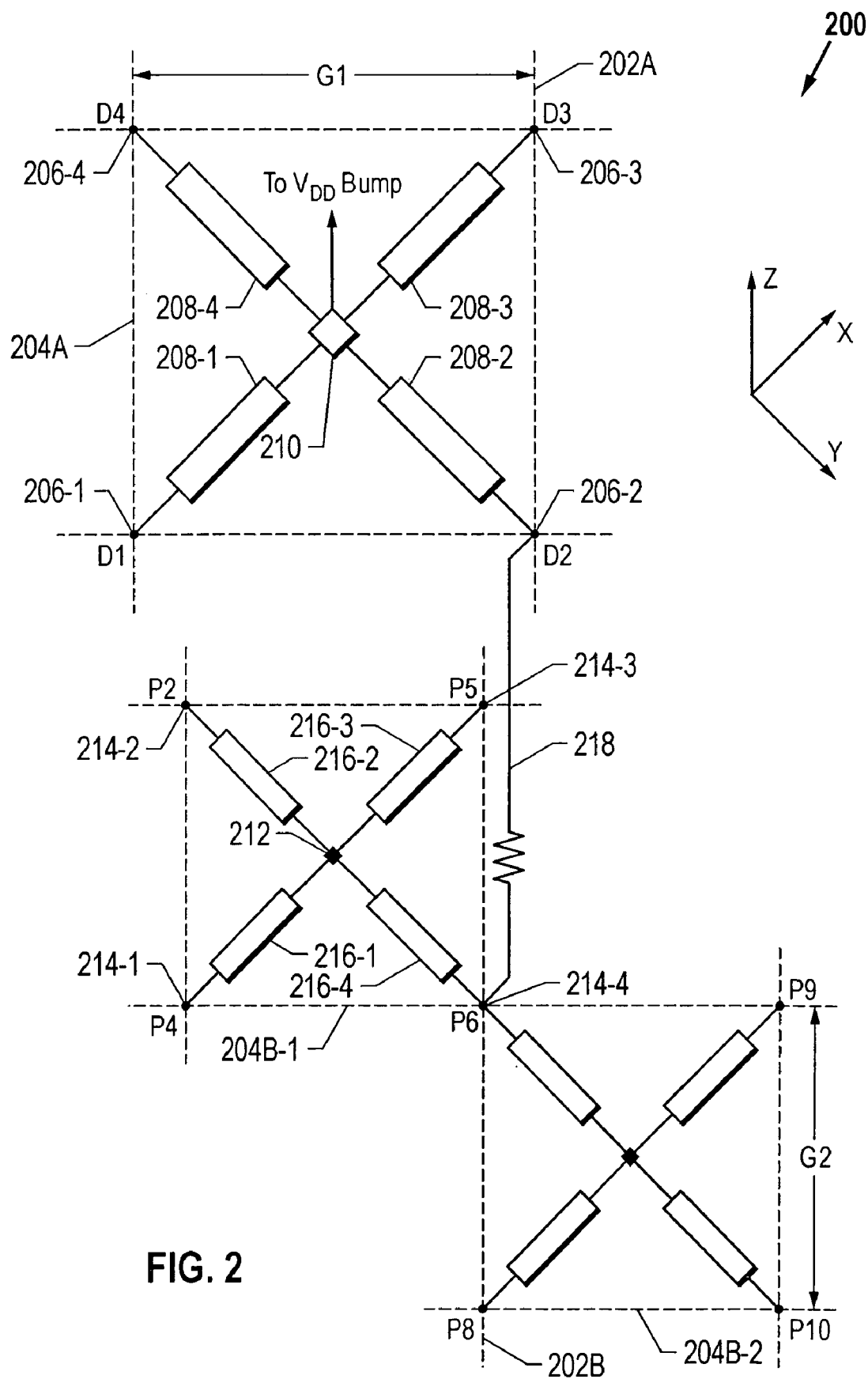
FIG. 2 depicts an embodiment wherein a die-level subcircuit layer is interconnected with a package-level subcircuit layer.

By way of illustration, the methodology for interconnecting two subcircuit grid layers, i.e., a first subcircuit layer, e.g., a die-level layer such as the on-chip power grid layer and a second subcircuit layer, e.g., a package-level layer, will now be described in particular detail. FIG. 2 depicts an embodiment 200 wherein a die-level OCPG subcircuit layer 202A having a first granularity is interconnected with a package-level subcircuit layer 202B having a second granularity. As explained in the aforementioned cross-referenced U.S. patent applications, the various logical component layers of a die-package-board entity may be modeled using cell grids of different granularities depending on the complexity of the constituent grid cells as well as the countervailing concerns of simulation efficiency and accuracy. For instance, the die-level OCPG subcircuit layer 202A may be obtained by applying a finer granularity than the granularity associated with the package-level subcircuit layer 202B. In one implementation, the granularity (G1) of the die-level OCPG subcircuit layer 202A may comprise a grid size of 190 μm×190 μm, whereas the granularity (G2) of the package-level subcircuit layer 202B may be a grid size that is an integral multiple of the G1 size. Clearly, various other granularity combinations and relationships may be provided for a particular integrated multi-layer subcircuit model construct depending on the electrical entity under simulation.

Continuing to refer to FIG. 2, reference numeral 204A refers to a simplified subcircuit cell of the die-level OCPG layer 202A. A plurality of co-planar circuit segments 208-1 through 208-4 form a planar circuit portion that includes a center port 210. In one embodiment, the circuit segments are aligned to the X- or Y-axis directions, and may include lumped resistive (R) elements or lumped resistive (R) and inductive (L) elements that are obtained via a suitable electromagnetic (EM) field solver. Further, each circuit segment is coupled at one end to the center port 210 and terminates at a port (or, node) that is operable to be connected to a corresponding port or node in a subcircuit that models an adjacent OCPG cell. As illustrated, circuit segment 208-1 is disposed between the center port 210 and a first node (D1) 206-1, circuit segment 208-2 is disposed between the center port 210 and a second node (D2) 206-2, circuit segment 208-3 is disposed between the center port 210 and a third node (D3) 206-3, and circuit segment 208-4 is disposed between the center port 210 and a forth node (D4) 206-4. Additional details regarding the OCPG subcircuit modeling may be found in the following commonly owned co-pending U.S. patent application entitled "SUBCIRCUIT FOR MODELING AN ON-CHIP POWER GRID IN AN INTEGRATED POWER GRID ANALYSIS ENVIRONMENT," filed Dec. 30, 2003; application Ser. No. 10/749,078, in the name(s) of: Yong Wang, Karl Bois, Jerimy Nelson and Mark Frank, cross-referenced hereinabove.

Reference numerals 204B-1 and 204B-2 refer to two simplified subcircuit cells of the package-level layer 202B. Each subcircuit cell includes a plurality of circuit segments commonly coupled to a center port, which form a planar subcircuit portion thereof. Each circuit segment includes extracted lumped R and L components disposed in a known topological orientation. Particularly referring to the subcircuit cell 204B-1, by way of example, a first circuit segment 216-1 is disposed between the center port 212 and a first node 214-1. Likewise, a second circuit segment 216-2 is disposed between the center port 212 and a second node 214-2, a third circuit segment 216-3 is disposed between the center port 212 and a third node 214-3, and a fourth circuit segment 216-4 is disposed between the center port 212 and a fourth node 214-4. The various nodes of the subcircuit cells 204B-1 and 204B-2 are arbitrarily labeled as P4, P5, P6 and P7 (for subcircuit cell 204B-1) and P6, P8, P9 and P10 (for subcircuit cell 204B-2), with node P6 being the common node between the two cells. Additional details regarding the package-level subcircuit modeling may be found in the following commonly owned co-pending U.S. patent application entitled "SYSTEM AND METHOD FOR IDENTIFYING COMMON VIA DENSITIES IN A PACKAGE," filed Dec. 30, 2003; application Ser. No. 10/748,019, in the name(s) of: Jerimy Nelson, Mark Frank and Yong Wang, cross-referenced hereinabove.

As alluded to in the Background section of the present patent application, the nodes of the one subcircuit layer need to be interconnected with the nodes of another subcircuit layer in order to integrate the various logical component layers into a single multi-layer construct for simulation. Accordingly, continuing to refer to FIG. 2, the nodes of the die-level OCPG subcircuit layer 202A are connected to the nodes of the package-level subcircuit layer 202B although there is no alignment between the two subcircuit layers in terms of the cell boundaries and sizes due to their different granularities. By way of illustration, node D2 is interconnected with node P6 using a connector subcircuit 218 upon employing a search scheme for discovering the location of P6 in the package-level subcircuit layer 202B.

Figure 3:
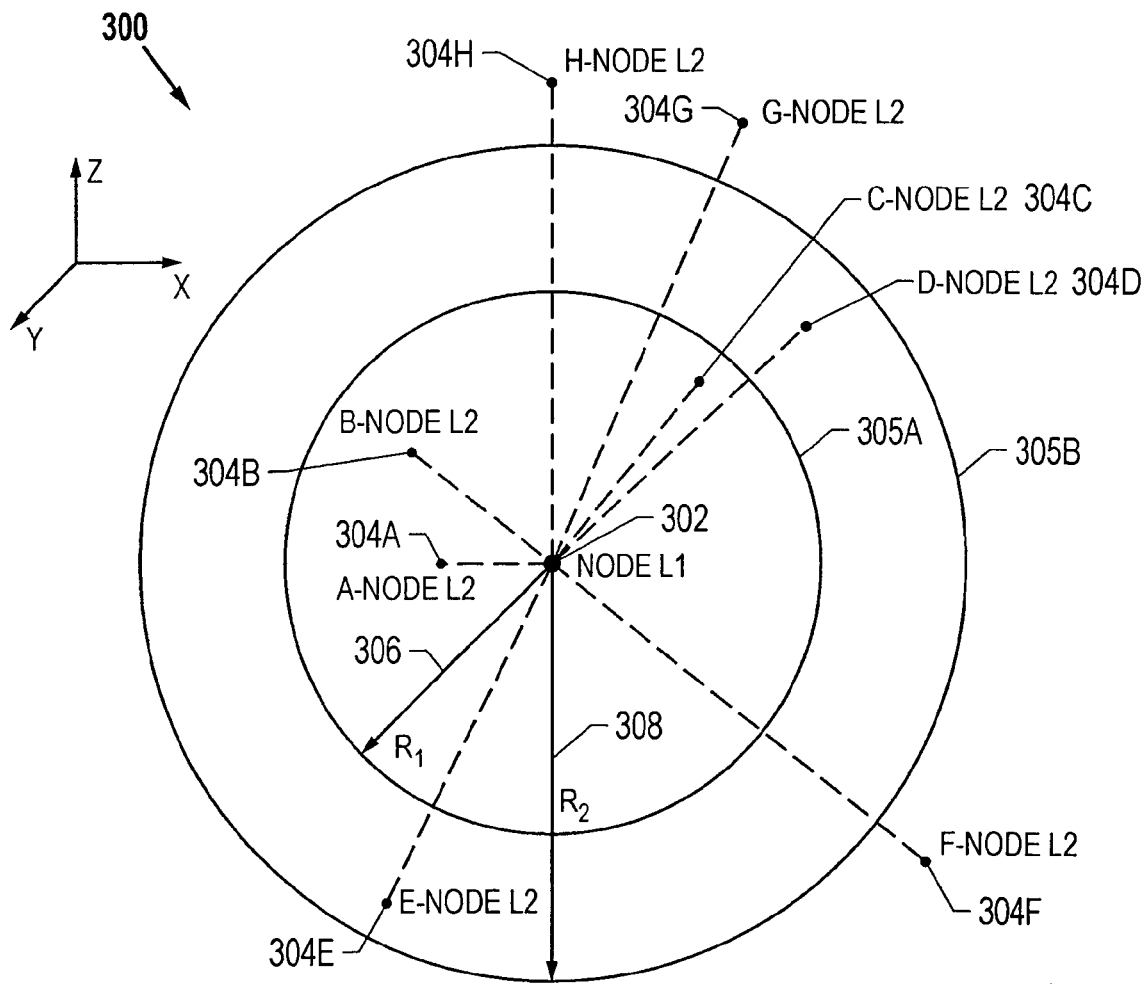
FIG. 3 illustrates an embodiment of a constraint-based search scheme for interconnecting a node of one subcircuit layer with a node of another subcircuit layer.

FIG. 3 illustrates an embodiment of a constraint-based search scheme 300 for interconnecting a node of one subcircuit layer with a node of another subcircuit layer. Where there is alignment between two subcircuit layers, the nodes of one layer (i.e., Node L1 or N1 nodes) spatially line up with the nodes of the other layer (i.e., Node L2 or N2 nodes), thereby facilitating a directly vertical connection between the applicable pairs of nodes of the two layers. On the other hand, if no direct connection is possible between an N1 node and an N2 node because they do not overlay each other, a nearest neighboring node (for example, from the N1 node) is discovered for making the connection therebetween. Reference numeral 302 refers to an exemplary N1 node (or, Node L1) of a first subcircuit layer (which, for instance, can be the die-level OCPG subcircuit layer 202A described above) that is to be interconnected to an N2 node of a second subcircuit layer (which can be the package-level subcircuit layer 202B). Eight N2 nodes are exemplified: A-Node L2 304A through H-Node L2 304H, and as illustrated, Node L1 does not overlay any of these N2 nodes.

In accordance with the teachings of the present invention, a first search region is defined for the second subcircuit layer whereby a search process is operable to determine if any N2 nodes are present therein. In one embodiment, the search region may comprise a circular region with a search radius extending from a point that is directly aligned to the location coordinates of the N1 node. Reference numeral 305A refers to a first search region having a first search radius R1 306 that extends from the point corresponding to the coordinates of the N1 node (i.e., Node L1). Three N2 nodes are shown to be within this search region: A-Node L2 304A, B-Node L2 304B and C-Node L2 304C. Each of these N2 nodes is disposed at a distance from the N1 node. The search process is operable to select one of the N2 nodes that is nearest to the N1 node under a distance-minimization constraint (where the pair-wise 3-dimensional distance metric $\Delta$ between the N2 nodes and N1 node is computed and the N2 node that satisfies Min$\{\Delta 1, \Delta 2, \ldots\}$ is selected).

Where there are no N2 nodes within the first search region 305A, an extended search region 305B may be defined with respect to the second subcircuit layer so that the search process can determine if a constraint-based N2 node is available for making a connection with the N1 node. It should be apparent to those skilled in the art that the search region may be iteratively incremented for a predetermined number of times or until a connection-capable candidate node is found. If there is no connection-capable candidate node is available at a search iteration, an error flag may be provided to the design simulation team (i.e., the user).

Figure 4:
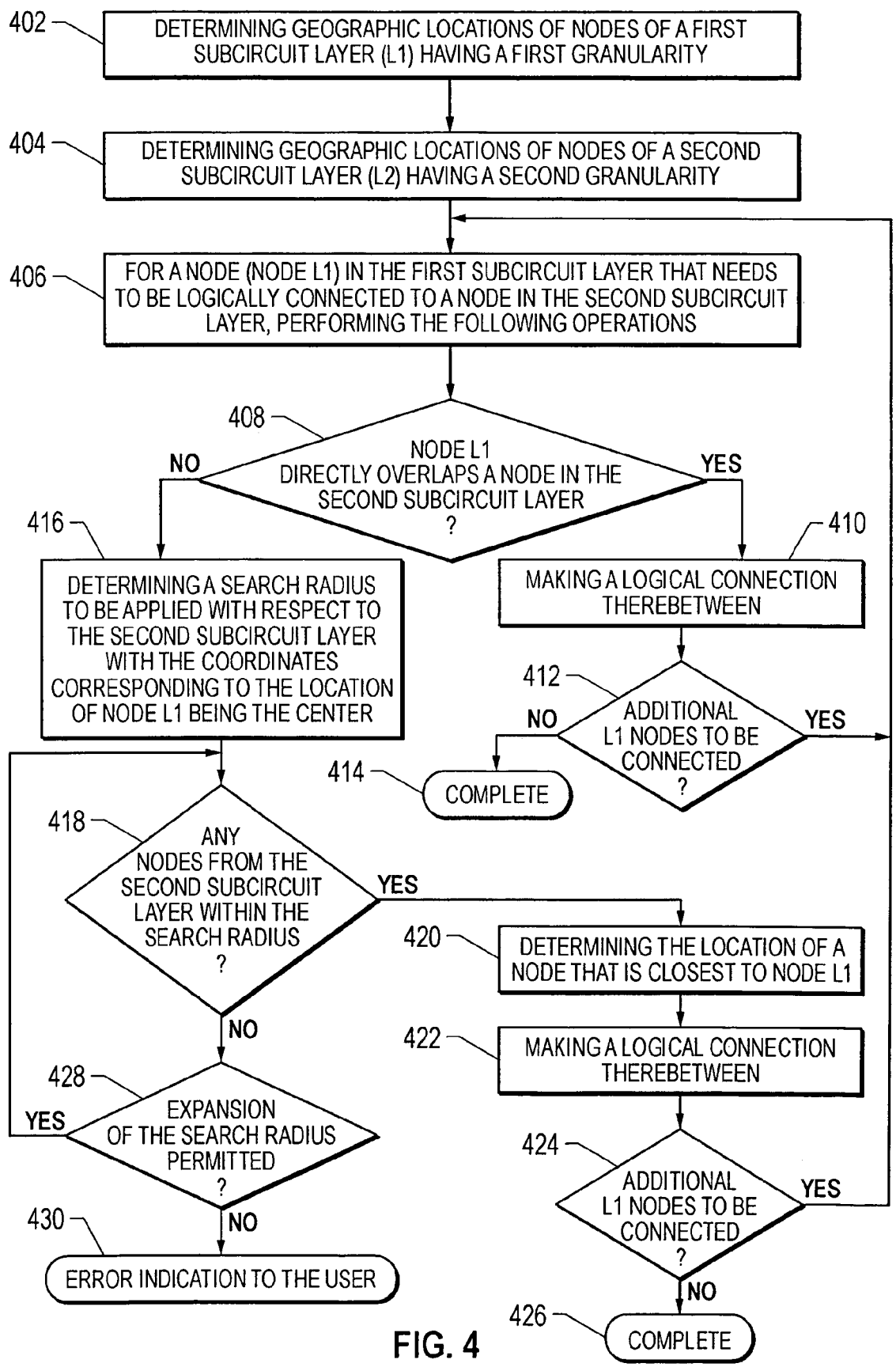
FIGS. 4 and 5 depict the various operations of a method in accordance with an embodiment of the invention.

FIG. 4 is a flow chart that captures the various operations involved in interconnecting the nodes of two subcircuit layers in accordance with the foregoing description. As set forth at blocks 402 and 404, geographic locations of nodes of a first subcircuit layer (L1) having a first granularity and geographic locations of nodes of a second subcircuit layer (L2) having a second granularity are determined. For a node (Node L1) in the first subcircuit layer that needs to be logically connected to a node in the second subcircuit layer as provided at block 406, a number of operations may be effectuated as described immediately below.

A determination is made as to whether Node L1 directly overlaps a node in the second subcircuit layer (decision block 408). If so, a logical connection is made therebetween by way of defining a suitable connector subcircuit between the nodes (block 410). If additional L1 nodes need to be interconnected with nodes in the second subcircuit layer (decision block 412), the flow returns to block 406 for performing additional operations. Otherwise, the process flow is complete and the interconnection process stops (block 414).

If it is determined that Node L1 does not directly overlay a node in the second subcircuit layer, a search radius is determined with respect to the second subcircuit layer, with the location coordinates corresponding to the location of Node L1 being the center (block 416). Upon discovering that the search radius includes at least one node from the second subcircuit layer (decision block 418), the location of a node that is closest to Node L1 is determined (block 420) in accordance with a constraint-based process. Obviously, if there is only one node present in the search radius, there will be no need for such a process. Thereafter, a logical connection is made between the selected node of the second subcircuit layer and Node L1 (block 422). If no additional L1 nodes need to be interconnected (decision block 424), the process flow is deemed to be complete and the interconnection process stops (block 426). Otherwise, the flow returns to block 406 for additional interconnection operations.

Where there are no nodes to be discovered in the search radius (as determined by decision block 418), an expanded search radius may be permitted (decision block 428), whereupon the search process is operable to determine the location of the nearest node to Node L1 as before. This process may continue for a number of search iterations, or until an error indication is provided to the user (block 430).

Figure 5:
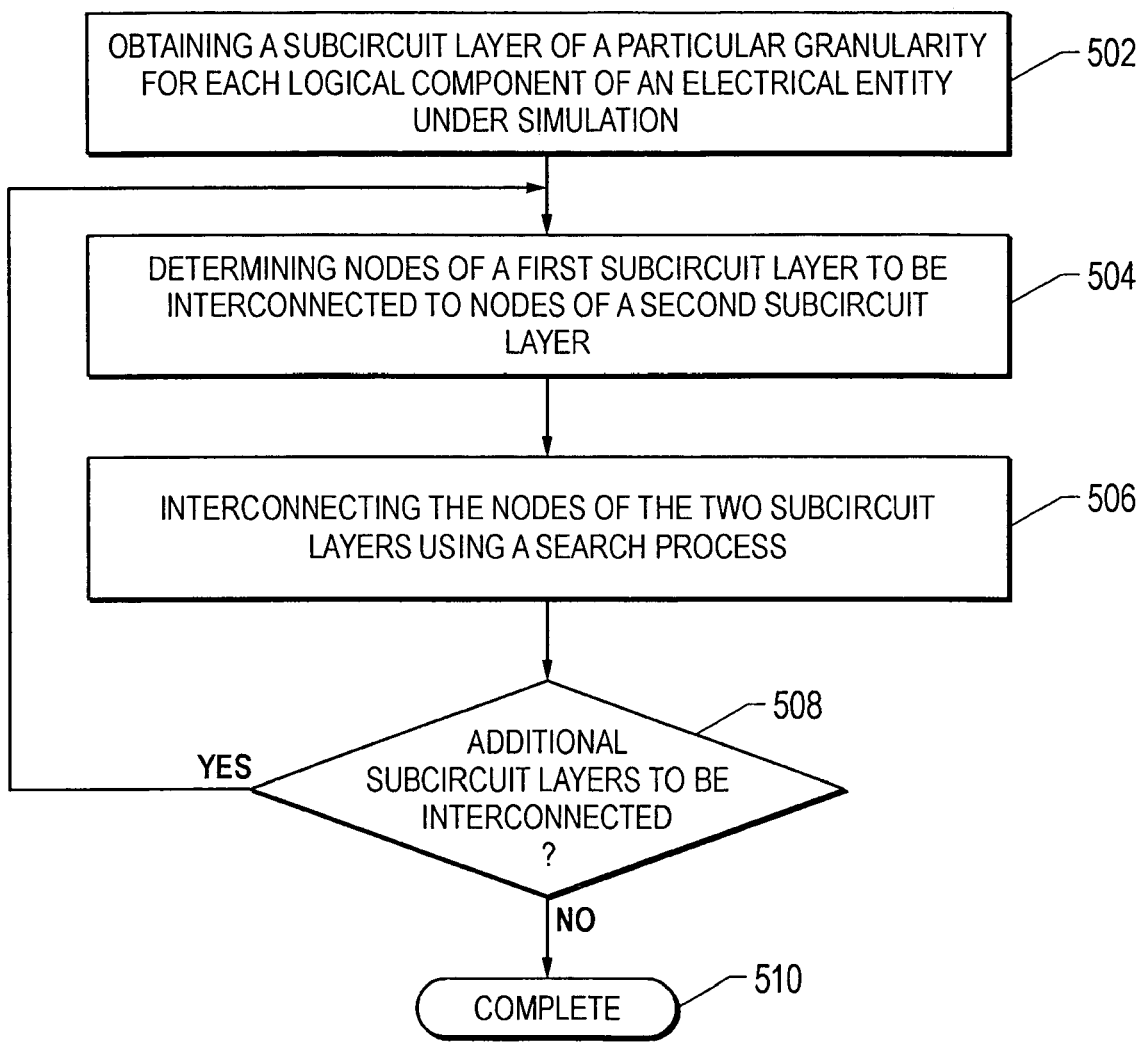

Referring now to FIG. 5, depicted therein is a flow chart of the various operations of a method for integrating subcircuit layers of an electrical entity (e.g., a die-package-board entity) in accordance with an embodiment of the invention. Upon obtaining a subcircuit layer of a particular granularity for each logical component of the electrical entity under simulation (block 502), the nodes of a first subcircuit layer (L1) to be interconnected with nodes of a second subcircuit layer (L2) are determined (block 504). In one implementation, the first and second subcircuit layers may be adjacent relative to each other. Thereafter, the nodes of the two subcircuit layers are interconnected (block 506), using a constraint-based search process such as the interconnection methodology described hereinabove, wherein any suitable search region (e.g., circular regions, square regions, rectangular regions, hexagonal or octagonal regions, and the like) may be employed. Appropriate inter-nodal connector subcircuits may be defined between any pair of L1 and L2 nodes as exemplified below:

.SUBCKT CONNECTOR-1 NODE-1 L1 NODE-1 L2
R NODE-1 L1 NODE-1 L2 5.0
.ENDS
.SUBCKT CONNECTOR-2 NODE-3 L1 NODE-2 L2
R NODE-3 L1 NODE-2 L2 4.0
.ENDS
. . .
.SUBCKT CONNECTOR-K NODE-M L1 NODE-N L2
R NODE-M L1 NODE-N L2 4.5
.ENDS

Where R, L and C components are involved, an inter-nodal connector subcircuit may be defined between any pair of nodes as shown below:

.SUBCKT CONNECTOR-1 NODE-1 L1 NODE-2 L2
R NODE-1 L1 NODE-INTER L-INTER 5.0
L NODE-INTER L-INTER NODE-2 3.0
C NODE-2 L2 GND 4.0
.ENDS

If additional subcircuit layers need to be interconnected (decision block 508), the process flow returns to block 504 for performing additional logical interconnections as described above. Otherwise, the subcircuit integration process is deemed complete (block 510), and the resultant multi-layer construct may be simulated as a single model using a suitable simulator, e.g., a SPICE simulator.

Based on the foregoing Detailed Description, it should be appreciated that the present invention provides a simple yet efficient scheme for integrating various subcircuit models into a single construct that can be readily provided to a simulator without having to manually create the necessary interconnecting subcircuits. In complex die-package-board designs, and where the use of different levels of granularity is routine, the number of nodes of a subcircuit layer that need to be interconnected to nodes of another subcircuit layer can be very large. Accordingly, it will be apparent to one skilled in that art that it is particularly advantageous in a power grid analysis environment to automatically integrate the various subcircuit layers into a single integrated subcircuit model, whereby a simulator can accurately and efficiently execute the resultant deck.

Although the invention has been particularly described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A method of integrating a plurality of subcircuit grids in a simulation environment, comprising:
   obtaining a subcircuit layer of a particular granularity for each logical component of an electrical entity under simulation; and
   interconnecting nodes of a first subcircuit layer to nodes of a second subcircuit layer using a constraint-based search process.

2. The method of integrating a plurality of subcircuit grids in a simulation environment as recited in claim 1, wherein said electrical entity under simulation comprises a semiconductor die disposed in a package and board environment.

3. The method of integrating a plurality of subcircuit grids in a simulation environment as recited in claim 2, wherein said subcircuit layer comprises an on-chip power grid subcircuit layer.

4. The method of integrating a plurality of subcircuit grids in a simulation environment as recited in claim 2, wherein said subcircuit layer comprises an on-chip load subcircuit layer.

5. The method of integrating a plurality of subcircuit grids in a simulation environment as recited in claim 2, wherein said subcircuit layer comprises a package-level subcircuit layer.

6. The method of integrating a plurality of subcircuit grids in a simulation environment as recited in claim 2, wherein said subcircuit layer comprises a die-level subcircuit layer.

7. The method of integrating a plurality of subcircuit grids in a simulation environment as recited in claim 2, wherein said subcircuit layer comprises a board-level subcircuit layer.

8. The method of integrating a plurality of subcircuit grids in a simulation environment as recited in claim 1, wherein said first and second subcircuit layers are disposed adjacent to each other.

9. The method of integrating a plurality of subcircuit grids in a simulation environment as recited in claim 1, wherein said search process is operable to interconnect a node (N1) of said first subcircuit layer to a node (N2) of said second subcircuit layer based on minimizing a distance between said N1 and N2 nodes.

10. The method of integrating a plurality of subcircuit grids in a simulation environment as recited in claim 9, wherein said search process is operable to determine if said second subcircuit layer contains any nodes within a first search region defined with respect to a point that corresponds to said N1 node's coordinates.

11. The method of integrating a plurality of subcircuit grids in a simulation environment as recited in claim 10, wherein said search process is operable to provide an error indication if said second subcircuit layer does not include any nodes within said first search region.

12. The method of integrating a plurality of subcircuit grids in a simulation environment as recited in claim 10, wherein said search process is operable to expand said first search region to a second search region if said second subcircuit layer does not include any nodes within said first search region.

13. The method of integrating a plurality of subcircuit grids in a simulation environment as recited in claim 12, wherein said search process is operable to provide an error indication if said second subcircuit layer does not include any nodes within said second search region.

14. The method of integrating a plurality of subcircuit grids in a simulation environment as recited in claim 1, wherein a node (N1) of said first subcircuit layer is interconnected to a node (N2) of said second subcircuit layer by a connector subcircuit disposed therebetween.

15. A system for integrating a plurality of subcircuit grids in a simulation environment, comprising:
   means for obtaining a subcircuit layer of a particular granularity for each logical component of an electrical entity under simulation; and
   means for interconnecting nodes of a first subcircuit layer to nodes of a second subcircuit layer using a constraint-based search process.

16. The system for integrating a plurality of subcircuit grids in a simulation environment as recited in claim 15, wherein said electrical entity under simulation comprises a semiconductor die disposed in a package and board environment.

17. The system for integrating a plurality of subcircuit grids in a simulation environment as recited in claim 16, wherein said subcircuit layer comprises an on-chip power grid subcircuit layer.

18. The system for integrating a plurality of subcircuit grids in a simulation environment as recited in claim 16, wherein said subcircuit layer comprises an on-chip load subcircuit layer.

19. The system for integrating a plurality of subcircuit grids in a simulation environment as recited in claim 16, wherein said subcircuit layer comprises a package-level subcircuit layer.

20. The system for integrating a plurality of subcircuit grids in a simulation environment as recited in claim 16, wherein said subcircuit layer comprises a die-level subcircuit layer.

21. The system for integrating a plurality of subcircuit grids in a simulation environment as recited in claim 16, wherein said subcircuit layer comprises a board-level subcircuit layer.

22. The system for integrating a plurality of subcircuit grids in a simulation environment as recited in claim 15, wherein said first and second subcircuit layers are disposed adjacent to each other.

23. The system for integrating a plurality of subcircuit grids in a simulation environment as recited in claim 15, wherein said search process is operable to interconnect a node (N1) of said first subcircuit layer to a node (N2) of said second subcircuit layer based on minimizing a distance between said N1 and N2 nodes.

24. The system for integrating a plurality of subcircuit grids in a simulation environment as recited in claim 23, wherein said search process is operable to determine if said second subcircuit layer contains any nodes within a first search region defined with respect to a point that corresponds to said N1 node's coordinates.

25. The system of integrating a plurality of subcircuit grids in a simulation environment as recited in claim 24, wherein said search process is operable to provide an error indication if said second subcircuit layer does not include any nodes within said first search region.

26. The system for integrating a plurality of subcircuit grids in a simulation environment as recited in claim 24, wherein said search process is operable to expand said first search region to a second search region if said second subcircuit layer does not include any nodes within said first search region.

27. The system for integrating a plurality of subcircuit grids in a simulation environment as recited in claim 26, wherein said search process is operable to provide an error indication if said second subcircuit layer does not include any nodes within said second search region.

28. The system for integrating a plurality of subcircuit grids in a simulation environment as recited in claim 15, wherein a node (N1) of said first subcircuit layer is interconnected to a node (N2) of said second subcircuit layer by a connector subcircuit disposed therebetween.

29. A computer-accessible medium operable with a computer platform to support a design simulation environment, the medium having stored thereon instructions for integrating a plurality of subcircuit grids generated in said design simulation environment, comprising:
   program code for obtaining a subcircuit layer of a particular granularity for each logical component associated with an electrical entity under simulation; and
   program code for interconnecting nodes of a first subcircuit layer to nodes of a second subcircuit layer using a constraint-based search process.

30. The computer-accessible medium as recited in claim 29, wherein said electrical entity under simulation comprises a semiconductor die disposed in a package and board environment.

31. The computer-accessible medium as recited in claim 30, wherein said subcircuit layer comprises an on-chip power grid subcircuit layer.

32. The computer-accessible medium as recited in claim 30, wherein said subcircuit layer comprises an on-chip load subcircuit layer.

33. The computer-accessible medium as recited in claim 30, wherein said subcircuit layer comprises a package-level subcircuit layer.

34. The computer-accessible medium as recited in claim 30, wherein said subcircuit layer comprises a die-level subcircuit layer.

35. The computer-accessible medium as recited in claim 30, wherein said subcircuit layer comprises a board-level subcircuit layer.

36. The computer-accessible medium as recited in claim 29, wherein said first and second subcircuit layers are disposed adjacent to each other.

37. The computer-accessible medium as recited in claim 29, wherein said search process is operable to interconnect a node (N1) of said first subcircuit layer to a node (N2) of said second subcircuit layer based on minimizing a distance between said N1 and N2 nodes.

38. The computer-accessible medium as recited in claim 37, wherein said search process is operable to determine if said second subcircuit layer contains any nodes within a first search region from a point that corresponds to said N1 node's coordinates.

39. The computer-accessible medium as recited in claim 38, wherein said search process is operable to provide an error indication if said second subcircuit layer does not include any nodes within said first search region.

40. The computer-accessible medium as recited in claim 38, wherein said search process is operable to expand said first search region to a second search region if said second subcircuit layer does not include any nodes within said first search region.

41. The computer-accessible medium as recited in claim 40, wherein said search process is operable to provide an error indication if said second subcircuit layer does not include any nodes within said second search region.

42. The computer-accessible medium as recited in claim 29, wherein a node (N1) of said first subcircuit layer is interconnected to a node (N2) of said second subcircuit layer by a connector subcircuit disposed therebetween.

* * * * *